United States Patent
Tamasato (10) Patent No.: US 10,877,486 B2
(45) Date of Patent: Dec. 29, 2020

(54) OPERATION SYSTEM FOR WORKING MACHINE

(71) Applicant: J THINK CORPORATION, Aichi (JP)

(72) Inventor: Yoshinao Tamasato, Aichi (JP)

(73) Assignee: J THINK CORPORATION, Aichi (JP)

( * ) Notice: Subject to any disclaimer, the term of this patent is extended or adjusted under 35 U.S.C. 154(b) by 0 days.

(21) Appl. No.: 16/776,517

(22) Filed: Jan. 30, 2020

(65) Prior Publication Data
US 2020/0218286 A1    Jul. 9, 2020

Related U.S. Application Data

(63) Continuation of application No. PCT/JP2017/027809, filed on Aug. 1, 2017.

(51) Int. Cl.
| | | |
|---|---|---|
| *G05D 1/06* | (2006.01) | |
| *B64C 39/02* | (2006.01) | |
| *G05D 1/00* | (2006.01) | |
| *G06K 9/00* | (2006.01) | |

(52) U.S. Cl.
CPC ......... *G05D 1/0684* (2013.01); *B64C 39/024* (2013.01); *G05D 1/0027* (2013.01); *G06K 9/0063* (2013.01); *B64C 2201/08* (2013.01); *B64C 2201/123* (2013.01); *G05D 2201/0201* (2013.01)

(58) Field of Classification Search
CPC ............... G05D 1/0684; G05D 1/0027; G05D 2201/0201; G06K 9/0063; B64C 39/024; B64C 2201/123; B64C 2201/08
See application file for complete search history.

(56) References Cited

U.S. PATENT DOCUMENTS

| | | | |
|---|---|---|---|
| 8,571,800 B2 | 10/2013 | Fortune et al. | |
| 2008/0097693 A1* | 4/2008 | McCain | E02F 3/435 |
| | | | 701/468 |
| 2010/0283675 A1* | 11/2010 | McAree | E02F 3/435 |
| | | | 342/357.28 |
| 2014/0210663 A1 | 7/2014 | Metzler | |
| 2016/0157414 A1 | 6/2016 | Ackerman et al. | |
| 2016/0321763 A1 | 11/2016 | Shike | |
| 2017/0067734 A1 | 3/2017 | Heidemann et al. | |
| 2018/0282970 A1* | 10/2018 | Koga | E02F 9/205 |
| 2020/0010179 A1* | 1/2020 | Liu | B64C 1/36 |

FOREIGN PATENT DOCUMENTS

| | | |
|---|---|---|
| JP | 2008-102097 A | 5/2008 |
| JP | 2016-188806 A | 11/2016 |
| JP | 2016-212469 A | 12/2016 |
| WO | 2017/099070 A1 | 6/2017 |

OTHER PUBLICATIONS

Notice of Allowance in JP Application No. 2017-555820, dated Nov. 24, 2017. 5pp.
Examination Report in in Application No. 202017006836, dated Jun. 25, 2020. 6pp.

* cited by examiner

*Primary Examiner* — Alan D Hutchinson
(74) *Attorney, Agent, or Firm* — Hauptman Ham, LLP (57) ABSTRACT

An operating system for a working machine includes drones having GNSS receivers, and working machines having take-off and landing ports and is configured so that positional information on the working machines is acquired by the GNSS receivers of the drones to be placed on the take-off and landing ports.

7 Claims, 8 Drawing Sheets

OPERATION SYSTEM FOR WORKING MACHINE

CROSS-REFERENCE TO RELATED APPLICATIONS

The present application is a continuation application of International Application No. PCT/JP2017/027809, filed on Aug. 1, 2017. The contents of this application are incorporated herein by reference in its entirety.

TECHNICAL FIELD

The present invention relates to an operation system for a working machine, such as a construction machine or an agricultural machine, the operation system using a GNSS.

BACKGROUND

In recent years, an unmanned automatic operation system, and an operation system supporting an operation of an operator, related to a working machine, such as a construction machine or an agricultural machine have been in practical use (refer to, for example, Patent Literature 1: Japanese Unexamined Patent Application Publication No. 2016-212469). The operation system supporting an operation of an operator includes machine guidance (MG), machine control (MC), or the like. The operation systems use a global navigation satellite system (GNSS), such as the GPS, GLONASS, or Galileo. Specifically, the working machine has an antenna (GNSS receiver) for receiving radio waves emitted by artificial satellites, and distances between the artificial satellites and the antenna are calculated based on trajectory and time information, received via the antenna, of the artificial satellites. The distances between the antenna and a plurality (four or greater or preferably five or greater) of the artificial satellites are calculated and a position where the antenna exists is calculated based on the distances. GNSSs are of types, such as point positioning, differential GPS (DGPS), and real time kinematic (RTK). An error of point positioning is approximately 10 meters, while an error of RTK is several centimeters. The working machine can be highly precisely operated by using a high-precision GNSS, such as RTK.

On the other hand, an antenna used for the high-precision GNSS, such as RTK, is expensive. Therefore, to prevent the expensive antenna from being stolen, the antenna is removed from the working machine and stored in predetermined storage after working in many cases (refer to, for example, Patent Literature 2: Japanese Unexamined Patent Application Publication No. 2008-102097).

SUMMARY

Various exemplary embodiments of the invention provide an operation system for a working machine. The operation system includes a drone having a GNSS receiver, and a working machine having a take-off and landing port and is configured so that positional information on the working machine is acquired by the GNSS receiver of the drone to be placed on the take-off and landing port.

Further, various exemplary embodiments of the invention provide a working machine that includes a take-off and landing port and is configured so that positional information on the working machine is acquired by a GNSS receiver of a drone to be placed on the take-off and landing port.

DETAILED DESCRIPTION

Figure 1:
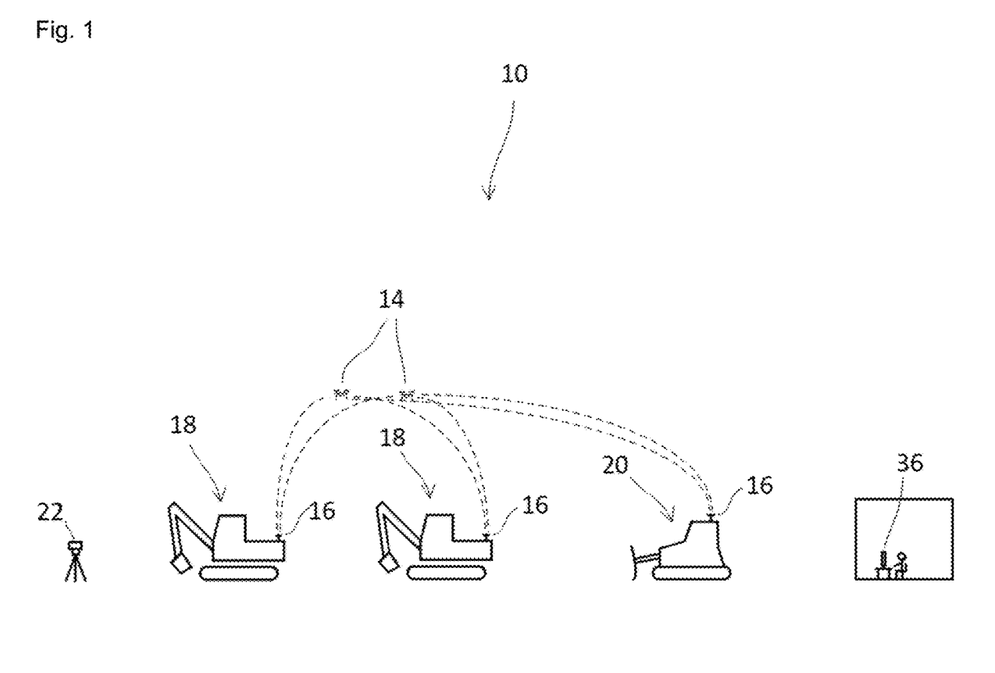
FIG. 1 is a side view schematically illustrating an overview of an operation system for a working machine according to a first embodiment of the invention.
Figure 2:
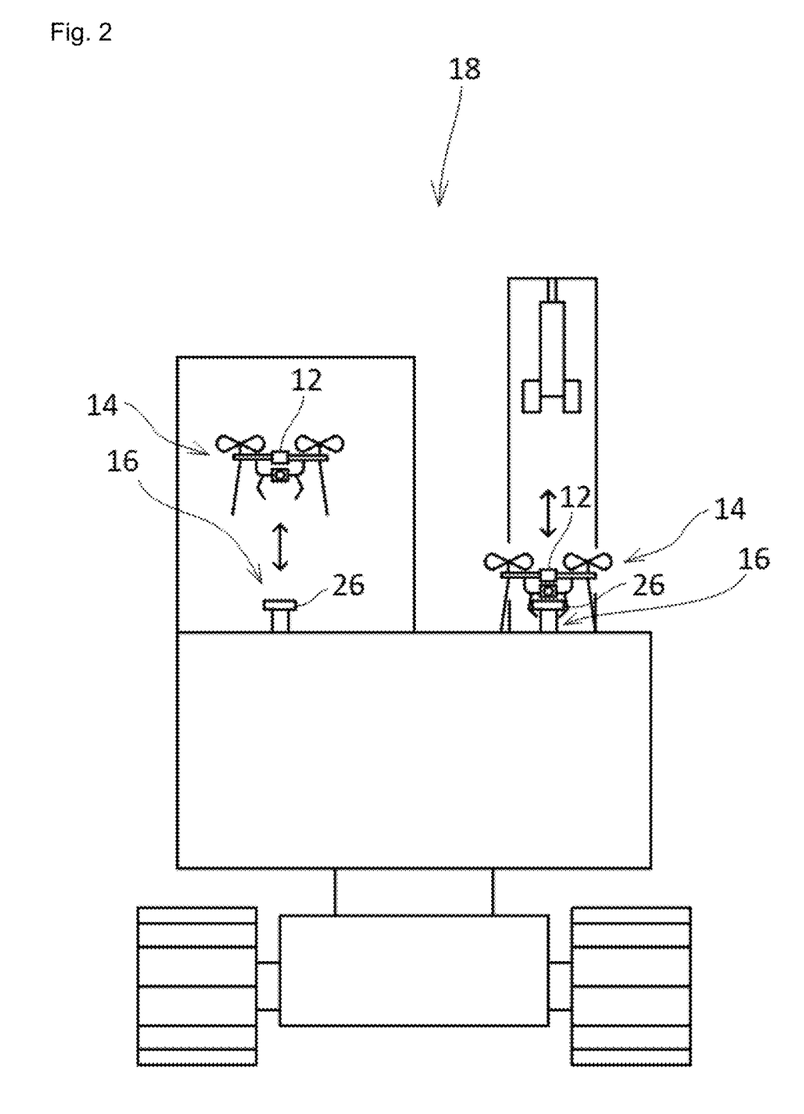
FIG. 2 is an enlarged rear view illustrating a working machine and a drone that are used in the operation system.
Figure 3:
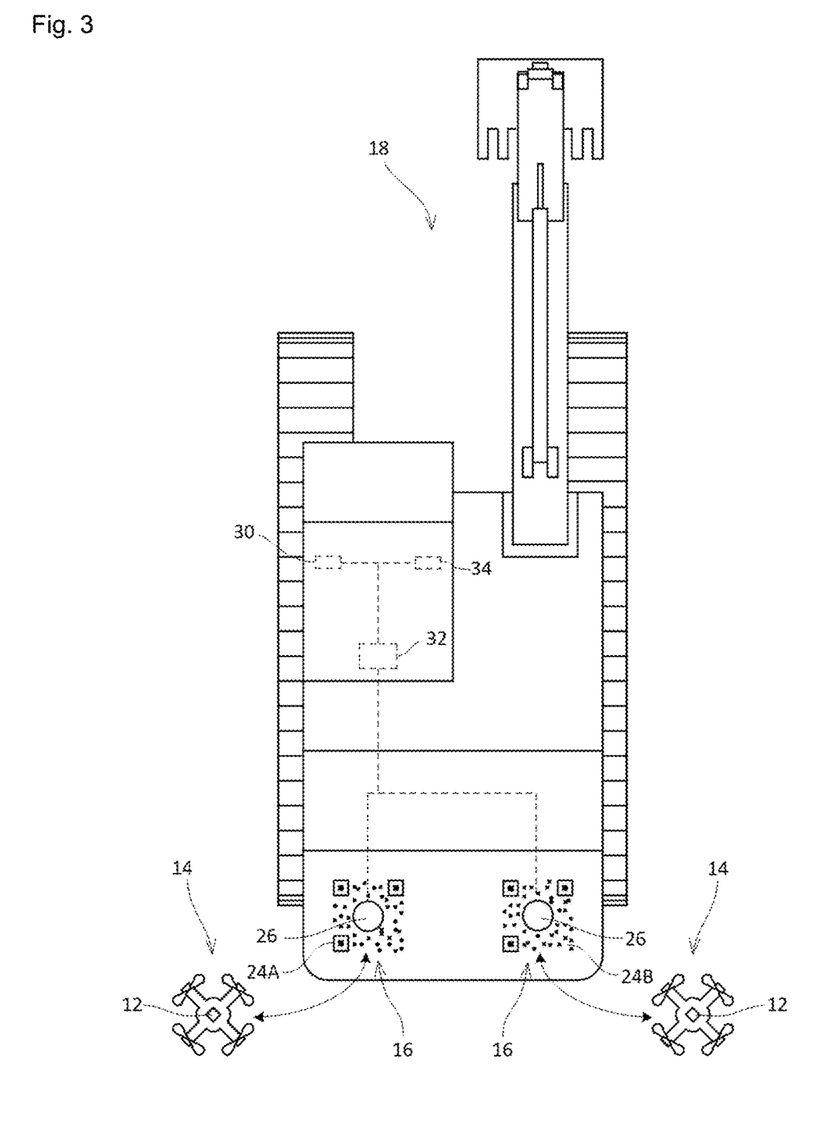
FIG. 3 is an enlarged plan view illustrating the working machine and the drone.

As illustrated in FIGS. 1 to 3, an operation system 10 for a working machine according to a first embodiment of the invention includes drones 14 having GNSS receivers 12, and working machines 18 and 20 having take-off and landing ports 16 and is configured so that positional information on the working machines 18 and 20 is acquired by the GNSS receivers 12 of the drones 14 to be placed on the take-off and landing ports 16. The positional information includes positional information in a horizontal direction and height information. In the first embodiment, RTK positioning is used as a GNSS. Each of the GNSS receivers 12 has a role of a mobile station for RTK. In addition, a fixed reference station 22 for RTK is installed at a working site. Network RTK may be used and a virtual reference point may be set instead of the installation of the fixed reference station 22.

The working machines 18 are hydraulic excavators, while the working machine 20 is a bulldozer. Although FIG. 1 illustrates the two working machines 18 and the one working machine 20 for convenience, the number of working machines may be two or four or greater. Types of the working machines are not limited as long as the working machines are self-propelled working machines. In the first embodiment, each of the working machines 18 and 20 has two take-off and landing ports 16 and is configured so that positional information on the working machine 18 or 20 is acquired by the two GNSS receivers 12 of the two drones 14 to be placed on the two take-off and landing ports 16. The two GNSS receivers 12 are used to acquire information of the orientation of the working machine 18 or 20 as well as the positional information on the working machine 18 or 20. Relative positions of buckets and a blade to the take-off and landing ports 16 can be calculated based on amounts of expansion and contraction of hydraulic cylinders. Alternatively, each of the working machines 18 and 20 includes an angular sensor for detecting an angle of an arm and a relative position of a bucket or a blade to the take-off and landing ports 16 can be calculated based on a detected value of the angular sensor. Alternatively, each of the working machines 18 and 20 includes a camera installed near a driver seat for taking an image of the bucket or the blade and a relative position of a bucket or a blade to the take-off and landing ports 16 can be calculated based on image data. By installing two cameras, distances between the bucket or the blade and the cameras can be calculated. Alternatively, by installing a single laser measurer, a distance between the bucket or the blade and the laser measurer can be calculated. The laser measurer and the single camera can be used in combination.

Figure 4:
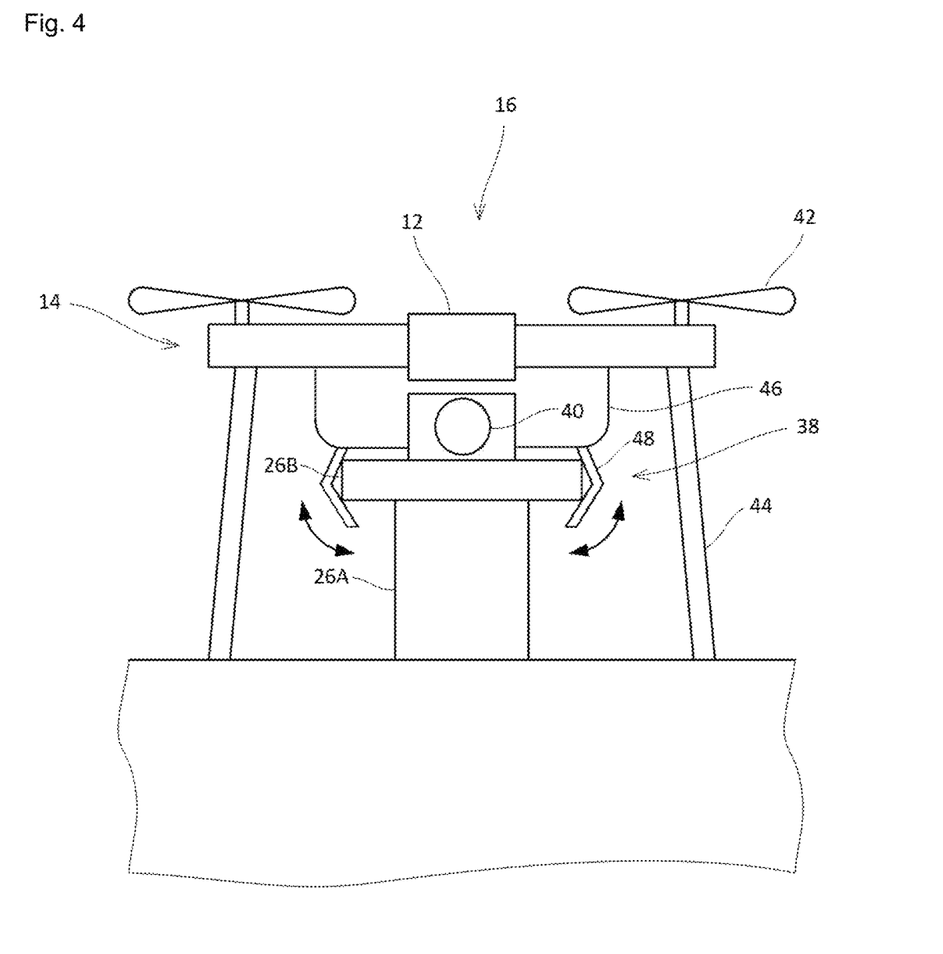
FIG. 4 is a further enlarged rear view illustrating a drone take-off and landing section of the working machine and the drone.
Figure 5:
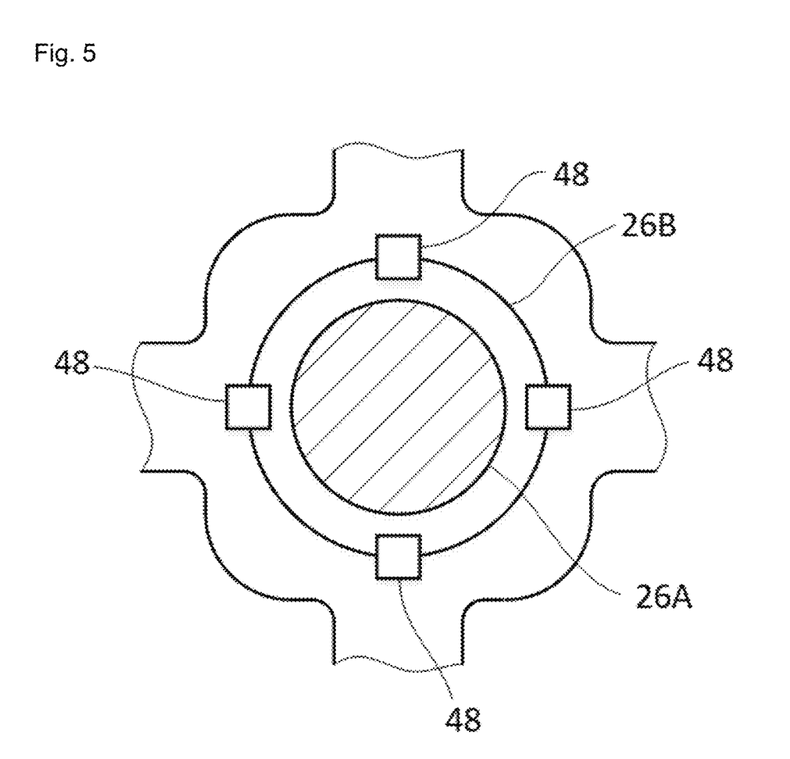
FIG. 5 is a bottom view illustrating a holding mechanism of the drone.
Figure 6:
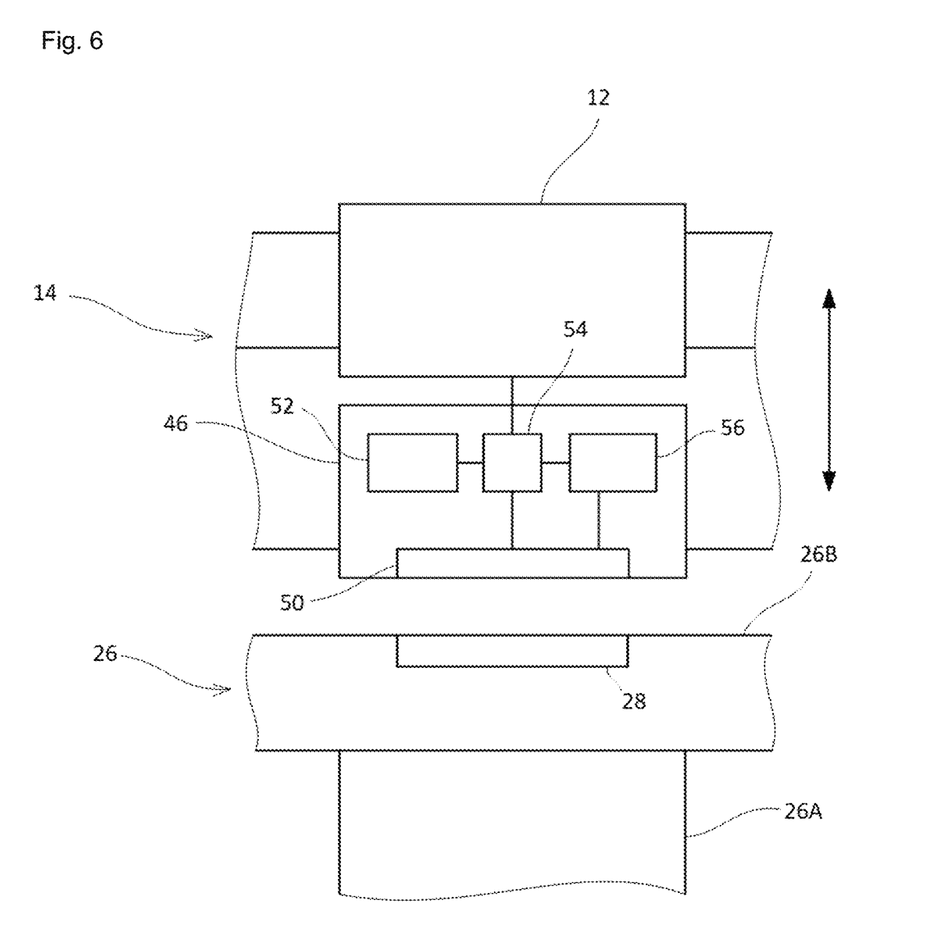
FIG. 6 is a block diagram schematically illustrating an electrical connection between the drone take-off and landing section and the drone.

The two take-off and landing ports 16 are installed near rear portions of each of the working machines 18 and 20 and separated from each other in a width direction (left-right direction). Position marks 24A and 24B that are visible from above are installed on the two take-off and landing ports 16, respectively. The forms of the position marks 24A and 24b are not limited as long as they can be mutually identified by image recognition functions by cameras of the drones 14 and their positions can be recognized. Specific examples of the position marks 24A and 24B include marks like two-dimensional codes such as QR codes (registered trademark). Each of the position marks 24A and 24B may be a mark composed of a plurality of concentric circles, a mark composed of a plurality of radial straight lines, or the like. Holding sections 26 for holding the drones 14 are installed at the centers of the position marks 24A and 24B. As illustrated in FIGS. 4 and 5, each of the holding sections 26 includes a round bar-shaped base 26A that is long in a vertical direction, and a disk-shaped upper end 26B coaxially mounted on an upper end of the base 26A. As schematically illustrated in FIG. 6, a power transmission device 28 for charging the drone 14 is mounted on the upper end 26B. The power transmission device 28 may use a wireless system or a wired system. As the wireless system, for example, an electromagnetic induction system, a magnetic field resonance system, or the like may be used. Alternatively, when the wired system is used, for example, a portion of or the entire upper end 26B may have a role of a positive electrode of direct-current, and a portion that exists around the holding section 26 in the take-off and landing port 16 may have a role of a negative electrode (earth). In addition, each of the working machines 18 and 20 also includes a wireless communication device 30, a CPU 32, and a low-precision GNSS receiver 34. The wireless communication devices 30 are, for example, wireless LANs. The working machines 18 and 20 can communicate with the drones 14, an instruction terminal 36, and the like via the wireless communication devices 30. A wireless communication device for communicating with the drones 14 and a wireless communication device for communicating with the instruction terminal 36 may be common or different from each other. The low-precision GNSS receivers 34 correspond to, for example, the GPS for point positioning or the like.

Each of the drones 14 includes a holding mechanism 38, a camera 40, rotors 42, and a leg section 44, for example, as well as the high-precision GNSS receiver 12. In the first embodiment, each of the GNSS receivers 12 is included in a respective one of the drones 14. The holding mechanism 38 has four arms 48 protruding downward from a drone body section 46. The arms 48 are configured to swing with their roots on the drone body section 46 side as rotation centers. The arms 48 swing closer to each other, thereby gripping the upper end 26B of the holding section 26 of the take-off and landing port 16 so that the drone 14 is fixed to the take-off and landing port 16. The arms 48 swing farther from each other so that the drone 14 is released from the take-off and landing port 16. The number of arms 48 may be three or five or greater. As a driving source of the arms 48, a linear motor or a rotary motor may be used. The leg section 44 has a length so that the arms 48 of the holding mechanism 38 are located at a height where the arms 48 can grip the upper end 26B with the drone body section 46 being in the vicinity of or in contact with the upper end 26B of the holding section 26 of the take-off and landing port 16 in a state in which lower ends of the leg section 44 are in contact with the take-off and landing port 16 (or the drone 14 is landing on the take-off and landing port 16).

Photographing direction of the cameras 40 can be adjusted. The drones 14 recognize images of the position marks 24A and 24B of the take-off and landing ports 16 of the working machines 18 and 20 by means of the cameras 40 whose photographing directions are oriented directly downward, and can land so that the positions of the drones 14 match the positions (positions of the position marks 24A and 24B) of the take-off and landing ports 16. The drones 14 can acquire terrain data of the working site by means of the cameras 40 while flying. Each of the drones 14 includes four motors (not illustrated) for the four rotors 42. The drones 14 can fly in various directions by controlling the rotational speeds of the motors.

In addition, each of the drones 14 includes a charging device 50 for the power transmission device 28 of the take-off and landing port 16. As described above, power may be transmitted in a wireless system or in a wired system. As a wireless power transmission system, for example, an electromagnetic induction system or a magnetic field resonance system may be used. When power is transmitted in a wired system, a portion of or the entire drone body section 46 has a role of a positive electrode of direct-current, and the leg section 44 has a role of a negative electrode (earth). The arms 48 may have the role of the positive electrode of direct-current or the role of the negative electrode. Each of the drones 14 includes a wireless communication device 52, a CPU 54, and a battery 56. The drones 14 can communicate with the working machines 18 and 20, the instruction terminal 36, and the like via the wireless communication devices 52. A wireless communication device for communicating with the working machines 18 and 20 and a wireless communication device for communicating with the instruction terminal 36 may be common or different from each other.

Next, effects of the operation system 10 for a working machine are described. A work instruction related to an operation is given from the instruction terminal 36 to the working machines 18 and 20 and the drones 14. On the other hand, it is rare that all the working machines 18 and 20 are simultaneously operated by the operation system 10 using the GNSS. For example, only one working machine 18 may be operated by the operation system 10 using the GNSS, while the other working machines 18 and 20 may be operated by operators without using MG and MC or may be on standby or stopped. In such a case, the two drones 14 fly to the working machine 18 to be operated by the operating system 10 using the GNSS so that they are placed on the take-off and landing ports 16 of the working machine 18. The position of the working machine 18 is acquired by the low-precision GNSS receiver 34. In this case, either or both of the two drones 14 acquires or acquire terrain data of the working site and transmits or transmit the terrain data to the instruction terminal 36, the working machine 18, and the like while flying.

Next, the drones 14 recognize images of the position marks 24A and 24B of the take-off and landing ports 16 of the working machine 18 by means of the cameras 40 whose photographing directions are oriented directly downward, while flying above a position that has been acquired by the low-precision GNSS receiver 34 and at which the working machine 18 is predicted to exist, and above a region around the position. In this case, the drones 14 fly at heights higher than the highest section of the working machine 18. The positions and heights of the drones 14 are acquired by the high-precision GNSS receivers 12 of the drones 14. The height of the highest section of the working machine 18 is recognized in advance based on a design value of the working machine 18, the terrain data, and the like. When the two drones 14 recognize the images of the position marks 24A and 24B, the two drones 14 perform positioning, descend, and land so that the positions of the two drones 14 match the positions (positions of the position marks 24A and 24B) of the take-off and landing ports 16. One of the two drones 14 is instructed by the instruction terminal 36 to land on the position mark 24A, and the other of the two drones 14 is instructed by the instruction terminal 36 to land on the position mark 24B. The two drones 14 may land at the same time or may land at different times. For example, one of the drones 14 may land late after acquiring terrain data of the working site, and the other of the drones 14 may land first without acquiring terrain data of the working site or after acquiring terrain data of the working site for a shorter time period than the one of the drones 14. When the two drones 14 land at different times, it is possible to prevent the two drones 14 from contacting each other at the time of landing.

When the drones 14 land on the take-off and landing ports 16, the arms 48 of the holding mechanisms 38 swing closer to each other, thereby gripping the upper ends 26B of the holding sections 26 of the take-off and landing ports 16. Therefore, the drones 14 are fixed to the take-off and landing ports 16. The landing of the drones 14 on the take-off and landing ports 16 can be detected when current is allowed to flow between the power transmission device 28 of the working machine 18 and the charging devices 50 of the drones 14. The positions of the two take-off and landing ports 16 are calculated by the high-precision GNSS receivers 12 of the two drones 14 placed on the two take-off and landing ports 16. Specifically, the position and orientation of the working machine 18 are calculated. The positions (positions of the GNSS receivers 12) of the take-off and landing ports 16 may be calculated by the CPUs 54 of the drones 14. Alternatively, the CPU 32 of the working machine 18 may receive trajectory information and time information of artificial satellites from the drones 14 and calculate the positions (positions of the GNSS receivers 12) of the take-off and landing ports 16. The position of the bucket of the working machine 18 is calculated based on the positions, calculated in the foregoing manner, of the take-off and landing ports 16. While the position of the bucket is being monitored, the working machine 18 is operated by the operating system 10 using the GNSS and performs a working plan instructed by the instruction terminal 36.

When the working plan instructed by the instruction terminal 36 is completed, the working machine 18 is removed from operation work by the operation system 10 using the GNSS, and another working machine performs operation work by the operation system 10 using the GNSS. For example, the working machine 20 performs the next operation work by the operation system 10 using the GNSS. The two drones 14 placed on the working machine 18 are released from the take-off and landing ports 16 when the arms 48 of the holding mechanisms 38 swing farther from each other. Then, the two drones 14 take off from the take-off and landing ports 16 and fly toward the working machine 20. In this case, either or both of the two drones 14 acquires or acquire terrain data of the working site and transmits or transmit the terrain data to the instruction terminal 36, the working machine 20, and the like while flying. Then, when the two drones 14 land on the take-off and landing ports 16 of the working machine 20, an operation of the working machine 20 is performed by the operation system 10 using the GNSS in the same manner as the foregoing operation of the working machine 18 by the operation system 10 using the GNSS. After that, similarly, the common drones 14 fly from any of the working machines 18 and 20 to another one of the working machines 18 and 20, and thus operations of the working machines are repeatedly performed by the operation system 10 using the GNSS.

As described above, the common drones 14 fly from any of the working machines 18 and 20 to another working machine 18 or 20, and thus the high-precision GNSS receivers 12 of the drones 14 can be automatically shared by the plurality of working machines 18 and 20. Therefore, it is not necessary that high-precision GNSS receivers be prepared for the number of working machines. Accordingly, this contributes to a reduction in the cost of the operation system for a working machine. The operation system uses the GNSS. In the first embodiment, the two drones 14 are used. However, when the plurality of working machines 18 and 20 may be simultaneously operated by the operation system using the GNSS, it is sufficient to prepare twice the number of drones 14 as the number of working machines to be operated by the operation system using the GNSS.

Figure 7:
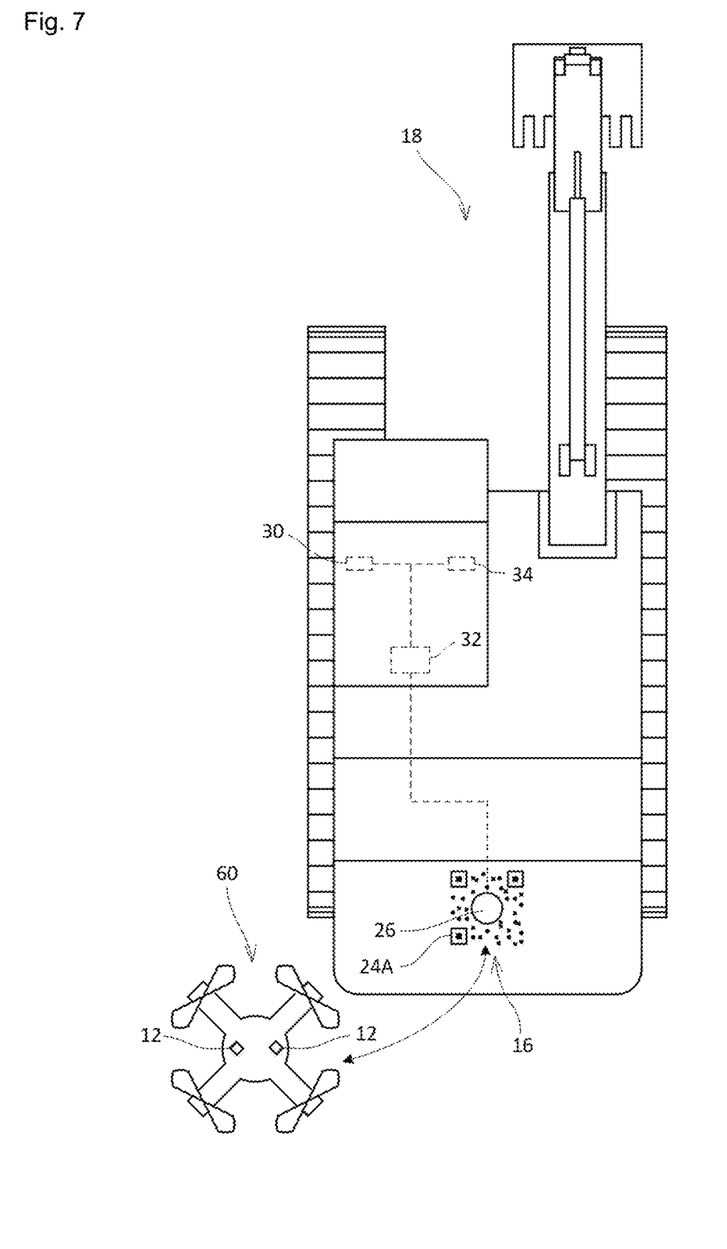
FIG. 7 is a plan view illustrating the working machine and a drone that are used in an operation system for a working machine according to a second embodiment of the invention.

Next, a second embodiment of the invention is described. In the first embodiment, each of the GNSS receivers 12 is included in a respective one of the drones 14. On the other hand, as illustrated in FIG. 7, in the second embodiment, a drone 60 includes two GNSS receivers 12. Each of the working machines 18 and 20 includes one take-off and landing port 16 and is configured so that positional information on the working machine 18 or 20 is acquired by the two GNSS receivers 12 of the one drone 60 to be placed on the take-off and landing port 16. When the plurality of working machines 18 and 20 may be simultaneously operated by the operation system using the GNSS, it is sufficient to prepare the same number of drones 60 as the number of working machines that may be operated by the operation system using the GNSS. Since other configurations are the same as those described in the first embodiment, the same configurations are indicated using the same reference signs and will not be described below.

Since the drone 60 includes the two GNSS receivers 12, and the number of drones is reduced to half of the number of drones, compared to the first embodiment, this contributes to a reduction in the cost. In addition, since it is sufficient if the single drone 60 takes off from and lands on one of the working machines 18 and 20, the control of the drone is easier, compared to the case where two drones take off and land. Although FIG. 7 illustrates one holding section 26 of the take-off and landing port 16, each of the take-off and landing ports 16 may include two holding sections 26. In this case, the drone 60 includes two holding mechanisms 38. Since the drone 60 is held on the take-off and landing port 16 with the two holding sections 26 and the two holding mechanisms 38, it is possible to reliably prevent the orientation of the drone 60 from being shifted from the working machines 18 and 20. In the second embodiment, since it is sufficient if the single drone 60 takes off from and lands on one of the working machines 18 and 20, the take-off and landing port may be installed on a roof for a driver seat.

Figure 8:
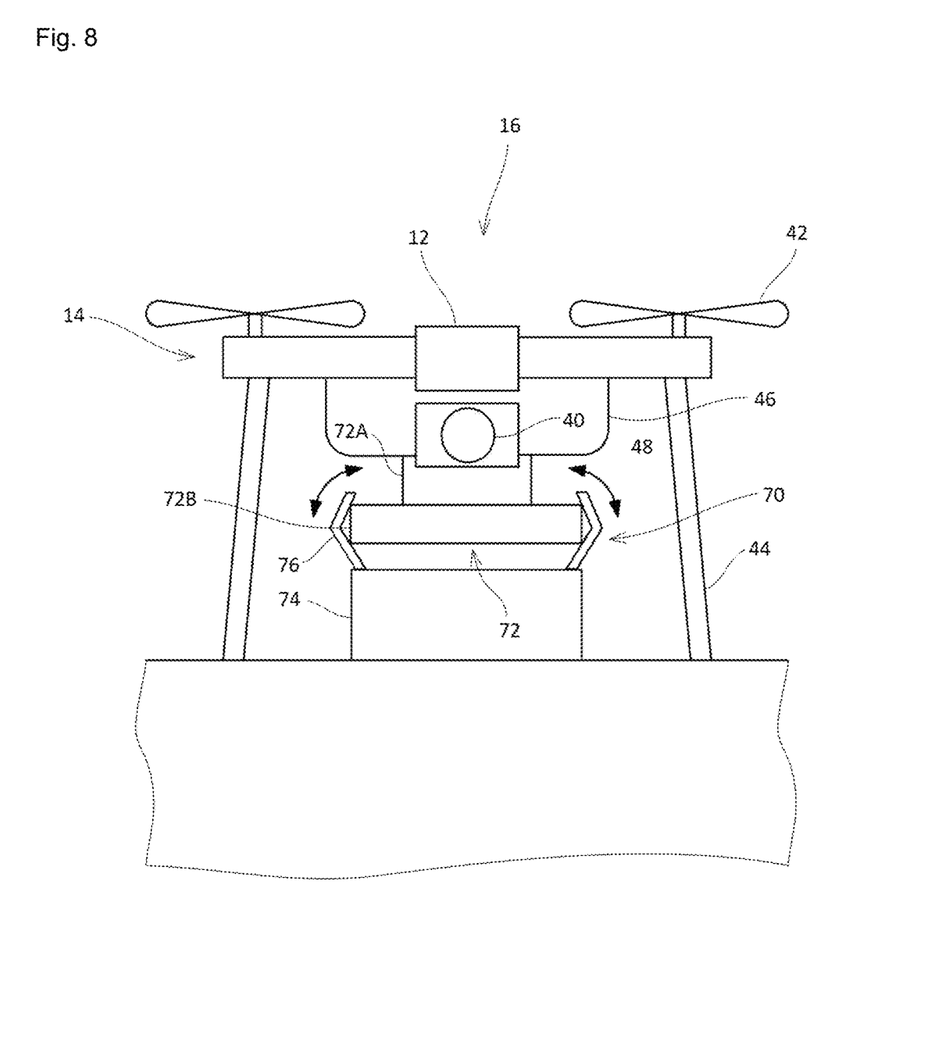
FIG. 8 is a rear view illustrating a drone take-off and landing section of a working machine and a drone according to a third embodiment of the invention.

Next, a third embodiment of the invention is described. In the first and second embodiments, the holding mechanism 38 for enabling the drone 14 (60) to be held on the take-off and landing port 16 is included in the drone 14 (60). On the other hand, as illustrated in FIG. 8, in the third embodiment, a holding mechanism 70 for holding the drone 14 (60) on the take-off and landing port 16 is included in the take-off and landing port 16. In addition, the drone 14 (60) includes a holding section 72 to be held by the holding mechanism 70. Since other configurations are the same as those described in the first and second embodiments, the same configurations are indicated using the same reference signs and will not be described below.

The holding mechanism 70 includes a bar-shaped base 74 that is long in the vertical direction, and a plurality of arms 76 protruding upward from the base 74. The base 74 includes a power transmission device (not illustrated). The holding section 72 includes a round bar-shaped base 72A and a disk-shaped lower end 72B coaxially mounted on a lower end of the base 72A. The arms 76 are configured to swing with their roots on the base 74 side as rotation centers. The arms 76 swing closer to each other, thereby gripping the lower end 72B of the drone 14 (60) so that the drone 14 (60) is fixed to the take-off and landing port 16. Since the holding mechanism is included in the take-off and landing port and is not included in the drone, the structure of the drone can be simplified and reduced in weight.

In the first to the third embodiments, the holding mechanism 38 (70) has a configuration in which the plurality of arms 48 (76) grip the holding section 26 (72), but the configuration of the holding mechanism is not limited as long as the drone can be held on the take-off and landing port. For example, the drone 14 (60) may include two or four horizontal bar members coupling one of the lower ends of the leg section 44 to another lower end of the leg section 44, and a holding mechanism for holding the horizontal bar members may be included in the take-off and landing port 16.

In the first to the third embodiments, for the landing of the drone 14 (60) on the take-off and landing port 16, a landing position is corrected by only the recognition of images of the position marks 24A and 24B, but a unit for mechanically correcting the landing position may be added. For example, a tapered member having a conical outer side surface tapered upward may be included in the take-off and landing port 16, and a recess having an inner side surface and to be fitted into the outer side surface may be formed in the drone 14 (60). In this case, while the drone 14 (60) descends, the landing position of the drone 14 (60) is corrected so that the tapered member is fitted into the recess. Alternatively, the outer side surface of the tapered member and the inner side surface of the recess may be triangular pyramid surfaces or quadrangular pyramid surfaces. In this case, the orientation of the drone 14 (60) can be also corrected. The tapered member may be different from the holding section 26, but a side surface of the upper end 26B of the holding section 26 may be a conical surface, a triangular pyramid surface, or a quadrangular pyramid surface. Alternatively, the tapered member may be included in the drone, and the recess to be fitted into the tapered member may be included in the take-off and landing port 16.

In the first to the third embodiments, when the drone 14 (60) flies from any of the working machines 18 and 20 toward another one of the working machines 18 and 20, the drone 14 (60) acquires the terrain data of the working site. However, the drone 14 (60) may acquire the terrain data of the working site at another time. For example, work may be suspended periodically (every 2 hours as an example) during an operation of one working machine 18 (20) by the operating system using the GNSS, and the drone 14 (60) may take off from the working machine 18 (20) and acquire the terrain data of the working site. After acquiring the terrain data, the drone 14 (60) lands on the same working machine 18 (20) and the operation work is restarted by the operation system using the GNSS.

In the first to the third embodiments, the take-off and landing ports 16 are directly attached to the working machines 18 and 20 but may be indirectly attached to the working machines 18 and 20. Specifically, take-off and landing port adapter having the take-off and landing port may be formed and attached to the working machines. Due to the use of the take-off and landing port adapter, application to existing working machines is easy.

In the first to the third embodiments, the RTK positioning is used as the GNSS, but another positioning may be used as long as high-precision positioning is possible. In addition, artificial satellites of different positioning systems such as the GPS, GLONASS, QZSS, Galileo, BeiDou, and Gagan may be used in combination.

In the first to the third embodiments, the working machines 18 and 20 are the hydraulic excavators and the bulldozer, but may be other construction machines. In addition, the invention is applicable to agricultural machines such as a combine and a tractor. Furthermore, the working machines are not limited to the self-propelled working machines that move on land, and the invention is applicable to ship type working machines that move on water.

What is claimed is:

1. An operation system for a working machine, the operation system comprising:
    a drone having a GNSS receiver; and
    a working machine having a take-off and landing port, wherein
    the operation system is configured so that positional information on a position of the working machine is acquired by the GNSS receiver of the drone placed on the take-off and landing port.

2. The operation system for the working machine according to claim 1, wherein
    at least one of the drone and the take-off and landing port includes a holding mechanism for enabling the drone to be held on the take-off and landing port.

3. The operation system for the working machine according to claim 1, wherein
    the working machine includes two take-off and landing ports, and the operation system is configured so that the positional information on the position of the working machine is acquired by two GNSS receivers of two drones placed on the two take-off and landing ports.

4. The operation system for the working machine according to claim 1, wherein
    the drone includes two GNSS receivers, and
    the working machine is configured so that the positional information on the position of the working machine is acquired by the two GNSS receivers of the one drone placed on the take-off and landing port.

5. The operation system for the working machine according to claim 1, wherein
    the drone includes a camera and is configured to acquire terrain data of a working site while flying.

6. An operation system for a working machine, the operation system comprising:
    a drone having a GNSS receiver; and
    a take-off and landing adapter having a take-off and landing port and to be used by being attached to a working machine, wherein
    the operation system is configured so that positional information on a position of the working machine is acquired by the GNSS receiver of the drone placed on the take-off and landing port.

7. A working machine comprising
a take-off and landing port, wherein
the working machine is configured so that positional information on a position of the working machine is acquired by a GNSS receiver of a drone placed on the take-off and landing port.

* * * * *